(12) United States Patent  
Manessis et al.

(10) Patent No.: US 8,931,691 B2  
(45) Date of Patent: Jan. 13, 2015

(54) DYNAMIC PAYMENT DEVICE CHARACTERISTICS

(75) Inventors: Thomas Manessis, Pacifica, CA (US); Gary Gerber, Foster City, CA (US)

(73) Assignee: Visa U.S.A. Inc., San Francisco, CA (US)

(*) Notice: Subject to any disclaimer, the term of this patent is extended or adjusted under 35 U.S.C. 154(b) by 49 days.

(21) Appl. No.: 12/958,191

(22) Filed: Dec. 1, 2010

(65) Prior Publication Data

US 2011/0186626 A1   Aug. 4, 2011

Related U.S. Application Data

(63) Continuation of application No. 12/032,495, filed on Feb. 15, 2008, now Pat. No. 7,866,551.

(60) Provisional application No. 60/890,138, filed on Feb. 15, 2007.

(51) Int. Cl.
| | |
|---|---|
| G06K 5/00 | (2006.01) |
| G06F 7/08 | (2006.01) |
| G06K 7/01 | (2006.01) |
| G06K 19/06 | (2006.01) |
| G06Q 20/00 | (2012.01) |
| G06Q 40/00 | (2012.01) |
| G07F 7/10 | (2006.01) |
| G06Q 20/10 | (2012.01) |
| G06Q 20/20 | (2012.01) |
| G06Q 20/32 | (2012.01) |
| G06Q 20/34 | (2012.01) |

(52) U.S. Cl.
CPC .............. *G07F 7/1008* (2013.01); *G06Q 20/10* (2013.01); *G06Q 20/105* (2013.01); *G06Q 20/20* (2013.01); *G06Q 20/204* (2013.01); *G06Q 20/327* (2013.01); *G06Q 20/3415* (2013.01)
USPC ........ 235/380; 235/381; 235/382; 235/382.5; 235/492; 705/16; 705/17; 705/39; 705/41

(58) Field of Classification Search
USPC ........ 235/492, 375–382, 487; 705/16, 17, 39, 705/41
See application file for complete search history.

(56) References Cited

U.S. PATENT DOCUMENTS

| | | |
|---|---|---|
| 4,423,287 A | 12/1983 | Zeidler |
| 4,578,530 A | 3/1986 | Zeidler |
| 4,646,351 A | 2/1987 | Asbo et al. |

(Continued)

FOREIGN PATENT DOCUMENTS

| | | |
|---|---|---|
| KR | 10-1999-0078937 A | 5/1999 |
| KR | 10-2005-0089427 A | 9/2005 |

OTHER PUBLICATIONS

U.S. Appl. No. 12/778,446, filed Oct. 29, 2009, Perlman, 59 pages.

(Continued)

*Primary Examiner* — Thien M Le
*Assistant Examiner* — April Taylor
(74) *Attorney, Agent, or Firm* — Kilpatrick Townsend & Stockton LLP

(57) ABSTRACT

A payment device is disclosed. It includes a memory including payment data; and a display coupled to the memory. A processor is configured to execute one or more instructions for displaying the payment data on the display. The payment device is in the form of a card.

13 Claims, 3 Drawing Sheets

(56) References Cited

U.S. PATENT DOCUMENTS

| | | |
|---|---|---|
| 4,701,601 A | 10/1987 | Francini et al. |
| 4,734,564 A | 3/1988 | Boston et al. |
| 4,812,628 A | 3/1989 | Boston et al. |
| 4,822,985 A | 4/1989 | Boggan et al. |
| 4,870,259 A | 9/1989 | Boggan et al. |
| 4,906,826 A | 3/1990 | Spencer |
| 4,908,521 A | 3/1990 | Boggan et al. |
| 4,943,707 A | 7/1990 | Boggan |
| 5,276,311 A * | 1/1994 | Hennige .................. 235/380 |
| 5,396,624 A | 3/1995 | Campbell, Jr. |
| 5,450,491 A | 9/1995 | McNair |
| 5,450,537 A | 9/1995 | Hirai et al. |
| 5,465,206 A | 11/1995 | Hilt et al. |
| 5,477,038 A | 12/1995 | Levine et al. |
| 5,500,513 A | 3/1996 | Langhans et al. |
| 5,621,201 A | 4/1997 | Langhans et al. |
| 5,623,552 A | 4/1997 | Lane |
| 5,640,577 A | 6/1997 | Scharmer |
| 5,703,344 A | 12/1997 | Bezy et al. |
| 5,742,845 A | 4/1998 | Wagner |
| 5,771,101 A | 6/1998 | Bramall |
| 5,794,259 A | 8/1998 | Kikinis |
| 5,883,810 A | 3/1999 | Franklin et al. |
| 5,920,847 A | 7/1999 | Kolling et al. |
| 5,963,925 A | 10/1999 | Kolling et al. |
| 5,974,430 A | 10/1999 | Mutschler, III et al. |
| RE36,365 E | 11/1999 | Levine et al. |
| 6,000,832 A | 12/1999 | Franklin et al. |
| 6,003,014 A | 12/1999 | Lee et al. |
| 6,003,763 A | 12/1999 | Gallagher et al. |
| 6,005,942 A | 12/1999 | Chan et al. |
| 6,018,717 A | 1/2000 | Lee et al. |
| 6,019,284 A * | 2/2000 | Freeman et al. .............. 235/380 |
| 6,044,349 A | 3/2000 | Tolopka et al. |
| 6,067,621 A | 5/2000 | Yu et al. |
| RE37,122 E | 4/2001 | Levine et al. |
| 6,227,447 B1 | 5/2001 | Campisano |
| 6,233,683 B1 | 5/2001 | Chan et al. |
| 6,247,129 B1 | 6/2001 | Keathley et al. |
| 6,263,446 B1 | 7/2001 | Kausik et al. |
| 6,282,522 B1 | 8/2001 | Davis et al. |
| 6,285,991 B1 | 9/2001 | Powar |
| 6,298,336 B1 | 10/2001 | Davis et al. |
| 6,341,724 B2 | 1/2002 | Campisano |
| 6,367,011 B1 | 4/2002 | Lee et al. |
| 6,385,595 B1 | 5/2002 | Kolling et al. |
| 6,408,284 B1 | 6/2002 | Hilt et al. |
| 6,421,729 B1 | 7/2002 | Paltenghe et al. |
| 6,438,527 B1 | 8/2002 | Powar |
| 6,481,632 B2 | 11/2002 | Wentker et al. |
| 6,490,601 B1 | 12/2002 | Markus et al. |
| 6,499,042 B1 | 12/2002 | Markus |
| 6,560,581 B1 | 5/2003 | Fox et al. |
| 6,571,339 B1 | 5/2003 | Danneels et al. |
| RE38,255 E | 9/2003 | Levine et al. |
| 6,808,111 B2 | 10/2004 | Kashef et al. |
| 6,850,996 B2 | 2/2005 | Wagner |
| 6,873,974 B1 | 3/2005 | Schutzer |
| 6,907,476 B2 | 6/2005 | Wagner |
| 6,925,562 B2 | 8/2005 | Gulcu et al. |
| 6,980,970 B2 | 12/2005 | Krueger et al. |
| 7,007,840 B2 | 3/2006 | Davis |
| 7,028,008 B2 | 4/2006 | Powar |
| 7,039,611 B2 | 5/2006 | Devine |
| 7,051,929 B2 * | 5/2006 | Li .................. 235/380 |
| 7,062,706 B2 | 6/2006 | Maxwell et al. |
| 7,096,363 B2 | 8/2006 | Kon et al. |
| 7,099,850 B1 | 8/2006 | Mann, II et al. |
| 7,103,576 B2 | 9/2006 | Mann, III et al. |
| 7,159,180 B2 | 1/2007 | Ward |
| 7,177,848 B2 | 2/2007 | Hogan et al. |
| 7,210,169 B2 | 4/2007 | Smith et al. |
| 7,216,292 B1 | 5/2007 | Snapper et al. |
| 7,227,950 B2 | 6/2007 | Faith et al. |
| 7,231,045 B1 | 6/2007 | Parrott |
| 7,243,853 B1 | 7/2007 | Levy et al. |
| 7,254,569 B2 | 8/2007 | Goodman et al. |
| 7,257,581 B1 | 8/2007 | Steele et al. |
| 7,275,263 B2 | 9/2007 | Bajikar et al. |
| 7,280,981 B2 | 10/2007 | Huang et al. |
| 7,328,850 B2 | 2/2008 | Sines |
| 7,334,184 B1 | 2/2008 | Simons |
| 7,343,351 B1 | 3/2008 | Bishop et al. |
| 7,346,587 B2 | 3/2008 | Goldstein et al. |
| 7,347,361 B2 | 3/2008 | Lovett |
| 7,350,139 B1 | 3/2008 | Simons |
| 7,356,516 B2 | 4/2008 | Richey et al. |
| 7,356,706 B2 | 4/2008 | Scheurich |
| 7,366,703 B2 | 4/2008 | Gray et al. |
| 7,379,919 B2 | 5/2008 | Hogan et al. |
| 7,412,420 B2 | 8/2008 | Holdsworth |
| 7,415,443 B2 | 8/2008 | Hobson et al. |
| 7,427,033 B1 * | 9/2008 | Roskind .................. 235/492 |
| 7,437,575 B2 | 10/2008 | Dennis et al. |
| 7,437,757 B2 | 10/2008 | Holdsworth |
| 7,483,845 B2 | 1/2009 | Vetelainen |
| 7,512,975 B2 | 3/2009 | Aissi |
| 7,533,063 B2 | 5/2009 | Kianian |
| 7,533,828 B2 | 5/2009 | Ong |
| 7,568,631 B2 * | 8/2009 | Gibbs et al. .................. 235/494 |
| 7,593,875 B2 | 9/2009 | Granite et al. |
| 7,627,531 B2 | 12/2009 | Breck et al. |
| 7,660,779 B2 | 2/2010 | Goodman et al. |
| 7,664,699 B1 | 2/2010 | Powell |
| 7,689,459 B2 * | 3/2010 | Capurso et al. .................. 705/21 |
| 7,693,790 B2 | 4/2010 | Lawlor et al. |
| 7,716,596 B2 | 5/2010 | Cao et al. |
| 7,761,374 B2 | 7/2010 | Sahota et al. |
| 7,849,014 B2 | 12/2010 | Erikson |
| 2001/0032182 A1 | 10/2001 | Kumar et al. |
| 2001/0054148 A1 | 12/2001 | Hoornaert et al. |
| 2002/0111919 A1 | 8/2002 | Weller et al. |
| 2002/0116330 A1 | 8/2002 | Hed et al. |
| 2002/0153424 A1 * | 10/2002 | Li .................. 235/492 |
| 2002/0161704 A1 | 10/2002 | Powar |
| 2002/0178112 A1 | 11/2002 | Goeller et al. |
| 2002/0194138 A1 | 12/2002 | Dominguez et al. |
| 2002/0194503 A1 | 12/2002 | Faith et al. |
| 2003/0115142 A1 | 6/2003 | Brickell et al. |
| 2003/0120593 A1 | 6/2003 | Bansal et al. |
| 2003/0195843 A1 | 10/2003 | Matsuda et al. |
| 2003/0200184 A1 | 10/2003 | Dominguez et al. |
| 2003/0212642 A1 | 11/2003 | Weller et al. |
| 2003/0233292 A1 | 12/2003 | Richey et al. |
| 2004/0044621 A1 | 3/2004 | Huang et al. |
| 2004/0059688 A1 | 3/2004 | Dominguez et al. |
| 2004/0210566 A1 | 10/2004 | Smith et al. |
| 2004/0220964 A1 | 11/2004 | Shiftan et al. |
| 2005/0029344 A1 | 2/2005 | Davis |
| 2005/0036611 A1 | 2/2005 | Seaton et al. |
| 2005/0043997 A1 | 2/2005 | Sahota et al. |
| 2005/0077349 A1 | 4/2005 | Bonalle et al. |
| 2005/0102234 A1 | 5/2005 | Devine |
| 2005/0149455 A1 | 7/2005 | Bruesewitz et al. |
| 2005/0154877 A1 | 7/2005 | Trench |
| 2005/0177510 A1 | 8/2005 | Hilt et al. |
| 2005/0246278 A1 | 11/2005 | Gerber et al. |
| 2005/0269402 A1 * | 12/2005 | Spitzer et al. .................. 235/380 |
| 2006/0006224 A1 | 1/2006 | Modi |
| 2006/0049263 A1 * | 3/2006 | Ou et al. .................. 235/492 |
| 2006/0131393 A1 * | 6/2006 | Cok et al. .................. 235/380 |
| 2006/0161789 A1 * | 7/2006 | Doughty et al. .............. 713/186 |
| 2006/0179007 A1 | 8/2006 | Davis |
| 2006/0218098 A1 | 9/2006 | Walker et al. |
| 2006/0278698 A1 * | 12/2006 | Lovett .................. 235/380 |
| 2007/0005613 A1 | 1/2007 | Singh et al. |
| 2007/0005774 A1 | 1/2007 | Singh et al. |
| 2007/0055597 A1 | 3/2007 | Patel et al. |
| 2007/0055630 A1 | 3/2007 | Gauthier et al. |
| 2007/0100691 A1 | 5/2007 | Patterson |
| 2007/0136211 A1 * | 6/2007 | Brown et al. .................. 705/75 |
| 2007/0143605 A1 | 6/2007 | Metke et al. |
| 2007/0208671 A1 | 9/2007 | Brown et al. |
| 2008/0034221 A1 | 2/2008 | Hammad et al. |

(56) References Cited

U.S. PATENT DOCUMENTS

| | | |
|---|---|---|
| 2008/0071680 A1 | 3/2008 | Sheets |
| 2008/0071682 A1 | 3/2008 | Dominguez |
| 2008/0091619 A1 | 4/2008 | Perlman et al. |
| 2008/0110983 A1 | 5/2008 | Ashfield |
| 2008/0167991 A1 | 7/2008 | Carlson et al. |
| 2008/0177796 A1 | 7/2008 | Eldering |
| 2008/0203151 A1 | 8/2008 | Dixon et al. |
| 2008/0203152 A1 | 8/2008 | Hammad et al. |
| 2008/0203170 A1 | 8/2008 | Hammad et al. |
| 2008/0228653 A1 | 9/2008 | Holdsworth |
| 2008/0289022 A1 | 11/2008 | Chiu |
| 2009/0006646 A1 | 1/2009 | Duarte |
| 2009/0173782 A1 | 7/2009 | Muscato |
| 2009/0307493 A1 | 12/2009 | Smith |
| 2009/0313168 A1 | 12/2009 | Manessis |
| 2010/0023453 A1* | 1/2010 | Keresman et al. ............. 705/41 |
| 2010/0084476 A1* | 4/2010 | Zellner et al. ................ 235/492 |
| 2010/0114776 A1 | 5/2010 | Weller et al. |
| 2010/0223184 A1 | 9/2010 | Perlman |
| 2010/0257102 A1 | 10/2010 | Perlman |
| 2010/0274692 A1 | 10/2010 | Hammad |
| 2010/0274721 A1 | 10/2010 | Hammad |
| 2010/0293189 A1 | 11/2010 | Hammad |
| 2010/0293382 A1 | 11/2010 | Hammad |
| 2010/0306105 A1* | 12/2010 | Walker et al. ................ 705/41 |
| 2011/0106601 A1 | 5/2011 | Perlman et al. |
| 2011/0106674 A1 | 5/2011 | Perlman et al. |
| 2011/0106675 A1 | 5/2011 | Perlman et al. |
| 2011/0119155 A1 | 5/2011 | Hammad et al. |

OTHER PUBLICATIONS

U.S. Appl. No. 12/778,459, filed Oct. 29, 2009, Perlman, 58 pages.
U.S. Appl. No. 12/778,485, filed Oct. 29, 2009, Perlman et al., 60 pages.
U.S. Appl. No. 12/939,963, filed Nov. 4, 2010, Hammad et al., 105 pages.
U.S. Appl. No. 61/061,936, filed Jun. 16, 2008, Manessis, 12 pages.
U.S. Appl. No. 61/112,124, filed Nov. 6, 2008, Weller et al., 61 pages.
U.S. Appl. No. 61/178,636, filed May 15, 2009, Hammad, 58 pages.
U.S. Appl. No. 61/256,095, filed Oct. 29, 2009, Perlman, 40 pages.
U.S. Appl. No. 61/256,136, filed Oct. 29, 2009, Perlman, 64 pages.
U.S. Appl. No. 61/256,141, filed Oct. 29, 2009, Perlman, 38 pages.
U.S. Appl. No. 61/256,143, filed Oct. 29, 2009, Perlman et al., 29 pages.
U.S. Appl. No. 61/256,147, filed Oct. 29, 2009, Perlman, 41 pages.
U.S. Appl. No. 61/258,194, filed Nov. 4, 2009, Hammad, 147 pages.

* cited by examiner

US 8,931,691 B2

DYNAMIC PAYMENT DEVICE CHARACTERISTICS

CROSS REFERENCE TO RELATED APPLICATIONS

This patent application is a continuation of U.S. Non-Provisional application Ser. No. 12/032,495, filed on Feb. 15, 2008, which claims the benefit of and is a non-provisional of U.S. Provisional Application No. 60/890,138 filed on Feb. 15, 2007, both of which are herein incorporated by reference in their entirety for all purposes.

BACKGROUND

As methods and devices for engaging in financial transactions have increased and expanded into new horizons, age old problems such as fraud and counterfeiting persist. In fact, as applications and devices are developed making credit or debit based transactions a more attractive and readily available alternative to cash, fraud and counterfeiting activities have increased proportionately.

In order to protect financial institutions, consumers and merchants from the fraudulent use of transaction cards, the industry has developed and introduced many features designed to reduce fraud and counterfeiting such as holograms, special over-layers, and watermarks. Nonetheless, many of these features are proving to be less effective as financial transactions are increasingly being conducted in a non-face-to-face environment.

As a result of the introduction of new payment channels, devices and methods, new tools are needed to reduce fraud within the payment card industry. One of the largest challenges will be to prevent unauthorized use of payment account data. Current protection methods rely upon static account or authentication data which are vulnerable to multiple forms of attack.

One of the primary means by which unauthorized use of account information can be prevented is to include data that dynamically changes from transaction to transaction. Dynamically changing data makes compromised data essentially worthless for subsequent transactions because such transactions will require alternate data.

In addition, when account information is compromised via hacking, skimming, phishing or any other method, the use of the account associated with the compromised card is discontinued and the compromised card is replaced. The replacement card will be associated with a different account from the one associated with the compromised card and will display new card characteristics such as a new personal account number, card verification value, and/or expiration date. This requires the additional expense of issuing a new card to the cardholder in addition to requiring the cardholder to wait until a newly issued card can be delivered from the issuer of the card.

BRIEF SUMMARY

Embodiments of the invention address the above-noted problems and other problems. In addition, as new applications or functionality may be deployed on a card, it may be advantageous for the card to include a visible indicator that such functionality is available. For example, ATM cards can display indicators of the ATM systems on which they are operable, and contactless cards may include indicators that the card can communicate contactlessly with external devices. Additionally, issuers of cards may wish to issue cards which display different card characteristics, designs or logos. For instance, issuers may wish to provide cards that display designs pertaining to the time of year (e.g., seasonal, etc.), current events (e.g., Olympics, sporting events, holidays, etc.), or for other reasons.

It would also be desirable to be able to change card and account data dynamically. The changed card and account data may then be displayed on a payment device, such as a payment card, in a location at which the conventional static data is usually displayed.

In an embodiment of the invention, a payment device may include, but not require, a processor and a display in communication with the processor. The processor may be configured to execute one or more instructions that changes card data for use with a transaction and displays the changed card data on the display. The instructions may be in the form of data within a memory on the card.

Another embodiment of the invention is directed to a payment device comprising a memory comprising payment data and non-payment data and a display coupled to the memory. A processor is configured to execute one or more instructions for displaying the payment data and the non-payment data on the display. The payment device is in the form of a card.

Another embodiment of the invention is directed to a method for forming a payment device in the form of a card. The method comprises mounting a memory and a display on a plastic substrate. The memory comprises payment data and non-payment data. A processor is configured to execute one or more instructions for displaying the payment data on the display. The instructions may be stored in the memory and may be embodied as computer code.

In another embodiment of the invention, a payment device may include a memory and a display. An external processor may be used to change the data stored on the display in the course of performing transactions.

Another embodiment of the invention is directed to a method of using a payment device in the form of a card including a display. The method comprises: performing a first transaction between the payment device and a second device (e.g., a POS terminal) using a first value (e.g., a first CVV value) displayed on the display; generating a second value (e.g., a second CVV value); displaying the second value on the display; performing a second transaction using the second value; and displaying non-payment data (e.g., a logo, or coupon) on the display.

These and other embodiments of the invention are described in further detail below.

DETAILED DESCRIPTION

For purposes of this application, the term "payment device" can mean an easily portable device which may be used in a transaction as described herein. Without limiting the generality of the foregoing, "payment device" can include a device in the form of a card such as a magnetic stripe card, an integrated circuit card (also commonly known as a smartcard), a memory card, etc. The payment device may also be in the form of a credit card, debit card, stored value card, prepaid card, etc.

For purposes of this application, "contactless" or "wireless" can mean any communications method or protocol, including proprietary protocols, in which data is exchanged between two devices without the need for the devices to be physically coupled. Without limiting the generality of the foregoing, "contactless" or "wireless" can include data transmissions by laser, radio frequency, infrared communications, Bluetooth, or wireless local area network.

For purposes of this application, the term "payment service" can mean any application deployed on a payment device which causes the exchange of data between the payment device and any other device for the performance of a financial transaction.

For purposes of this application, "payment data" can mean those data elements used by the payment service to execute a transaction. For example and without limitation, "payment data" could include the primary account number, account name, expiration date, service codes, discretionary data, and the various forms of card verification values (referred to herein as "CVVs"). Payment data may also include information for multiple accounts or account users, in which case the payment data would include multiple account numbers, account names, or bank names.

For purposes of this application, the term "non-payment data" can mean those data elements that are stored on the payment device, but that are not necessary to conduct a transaction. Non-payment data could, however, be used in a transaction. For example and without limitation, "non-payment data" may include bank logos, coupons, or service logos. Such non-payment data may be used as part of a transaction, but may not be strictly necessary to conduct the transaction. For example, a coupon could be used in a transaction to provide a discount. However, a coupon is not necessary to conduct the transaction.

Storing "payment data" and "non-payment data" in a memory on a card and subsequently displaying such data on a display on the card is advantageous. By doing so, much more information including authentication information, branding information, and rewards information can be provided through the display on the card, thus making the card more functional. Also, as suggested herein, cards advantageously need not be re-issued if account data or the like is compromised.

I. Payment Devices and Methods

Figure 1:
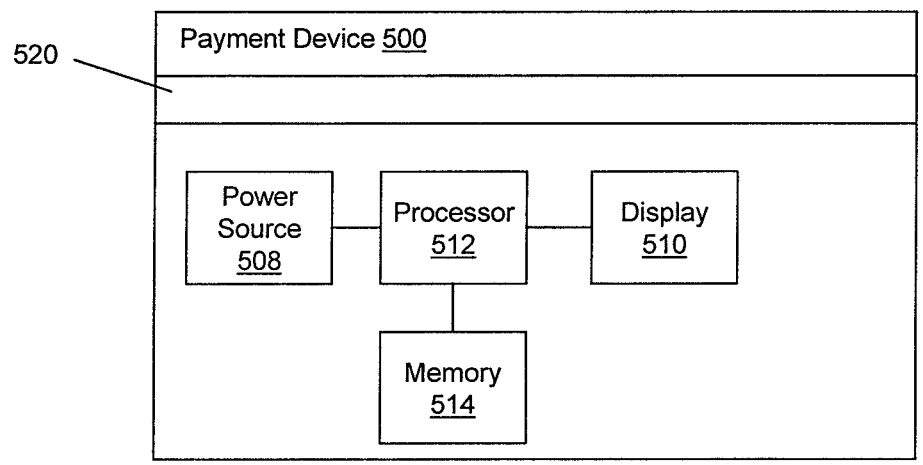
FIG. 1 depicts an exemplary payment device according to an embodiment of the invention.

FIG. 1 depicts an exemplary payment device according to an embodiment of the invention. As shown in FIG. 1, a payment device 500 may include a processor 512 and a display 510 in communication with the processor 512. The processor 512 may be embedded within the payment device 500 (between a plastic substrate and a cover sheet) and may include any electronic circuit or microprocessor capable of driving the display 510 to display one or more card characteristics. A memory 514 may be operatively coupled to the processor 512. The memory 514 may be a rewritable memory such as an EEPROM and may be in the form of a memory chip.

The processor 512 may be a combination of processors if, for instance, one processor is used solely to drive the display, and a second processor is used to perform other operations. These other operations could include, for instance, operations related to the payment service, cryptographic operations, operations related to other applications which may be deployed on the card, or any other application that may be useful or advisable to deploy in relation to the card.

Although the processor 512 and the memory 514 are shown as separate functional blocks, it is understood that they may be embodied as one computer chip, or more than one computer chip.

As shown in FIG. 1, a magnetic stripe 520 may also be present in the payment device 500. The magnetic stripe 520 may contain payment data such as a static CVV, account number, etc.

The display 510 (e.g., an LED or LCD display) may be embedded in the payment device 500. Because the payment data may be dynamically generated for each transaction and stored in the memory 514, a person conducting a transaction may be required to physically possess the card in order to provide the proper payment data for the transaction. For instance, a person may be required to provide the correct CVV to a merchant before the transaction can be completed.

The display 510 may include any display sized to be used with a payment device 500. In an embodiment, the display 510 may be sized to simultaneously display at least the number of digits (e.g., 3 or 4 digits) used in a CVV. It will be apparent to those of skill in the art that the display 510 can be sized and placed as appropriate, considering the card characteristics to be displayed.

A CVV is an example of payment data, since it is needed to conduct a payment transaction. Other examples of payment data include an account number, a name, an expiration date, etc. Processes for forming and using CVV values such as DCVV values are described in U.S. patent application Ser. No. 10/642,878 filed on Aug. 18, 2003, which is herein incorporated by reference in its entirety for all purposes.

The display may be used to display non-payment data as well. It may be desirable to change the functionality of the card, in which case the display 510 could show, for instance, an ATM logo, signifying to a user whether the payment device is ATM capable. The payment device 500 may be re-branded, in which case the display 510 may show the issuer's new logo. Holograms could also be displayed on the display 510. In embodiments of the invention, not every card characteristic needs to be displayed on the display 510. Other card characteristic data may be printed or embossed on the payment device 500.

Other examples of non-payment data include coupons or other reward based messages. In some embodiments, the reward messages may be machine readable (e.g., messages in the form of two or three dimensional bar codes).

Another example of non-payment data that can be stored in the memory 514 and that can be displayed on the display 510 is account balance information.

In embodiments of the invention, payment data and non-payment data may be displayed sequentially or on the same display 510. For example, in some embodiments, a logo may be displayed on the display 510 and then a CVV may be displayed on the display 510. In other embodiments, the logo and CVV may be displayed on the same display 510.

Alternatively, the payment device 500 may include a plurality of displays (not shown), each of which is in communication with the processor 512. For instance, in another embodiment of the invention, the payment device 500 may include two displays, each of which is like the display 510. One display can be used to display the account number and the other display can be used to display the CVV. In such an embodiment, not only could a new CVV be generated and displayed for each transaction but, if the account number is compromised, a new account number could be created and subsequently displayed without re-issuing a new payment device.

On the other hand, one display 510 may be used to display multiple card characteristics. For instance, if the payment device 500 is a credit card, a single large display 510 on the front of the payment device 500 may display the account name, account number, bank name, and bank logo.

In another embodiment of the invention, the display 512 may be located on the payment device 100 at a location commonly associated with the displayed card characteristic. For instance, if the payment device 512 is a credit card, the display 510 may be placed near the rightmost end of a signature block, on the back of the payment device 500, to display a CVV value. An additional display 510 may be placed on the front of the payment device 500 to display the account number and/or other card characteristics, if desired.

The processor 512 can communicate with an external or second device such as a POS terminal using commercially available contact and contactless communication technologies. In addition, the processor 512 may be powered via a contactless element (e.g., an inductive coupling element) or a power source 508 such as a battery, which resides in the payment device 500.

In an embodiment of the invention, the payment device 500 does not have a built-in power source. It is instead powered by inductive coupling. In this case, it is desirable to use a display technology that does not require a constant power source. One solution to this requirement is the use of a bistable display. A bistable display is characterized in that, after power is removed from the bistable display, the image displayed while the bistable display was powered remains on the display. Bistable displays are known in the art and are available from, e.g., Nemoptics (France) or ZBD Displays Ltd. (United Kingdom).

Figure 2:
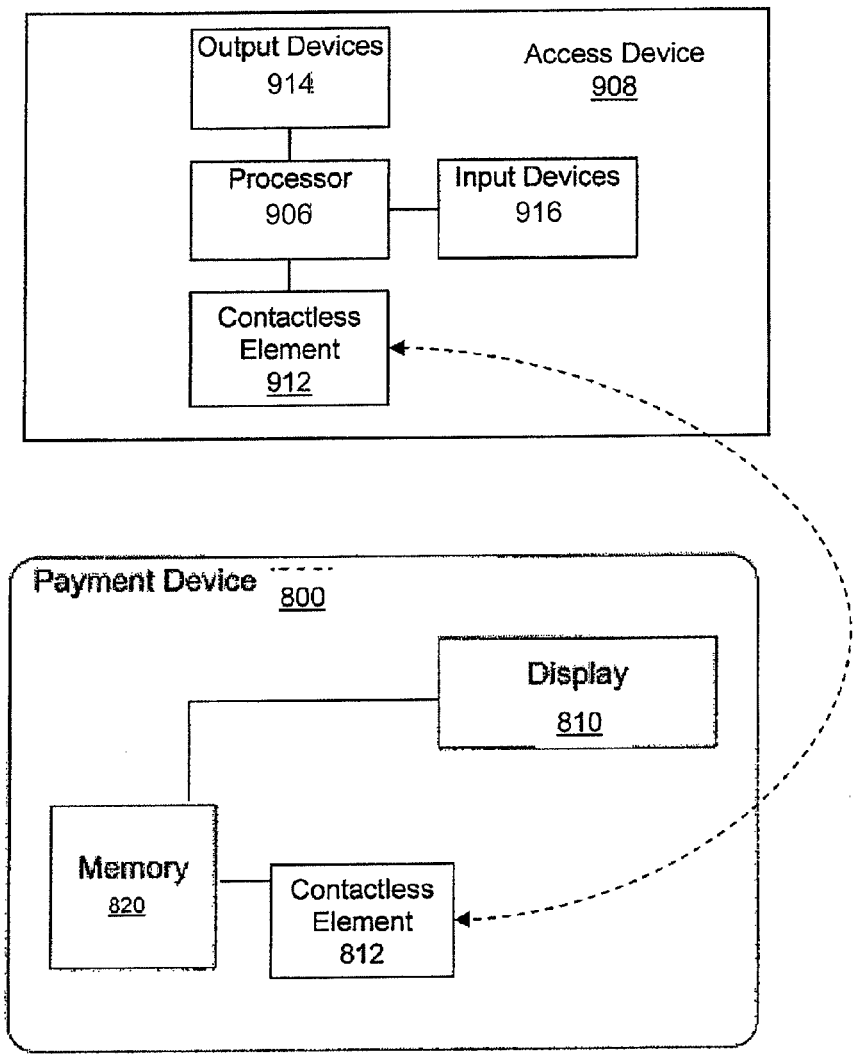
FIG. 2 depicts a system including an exemplary payment device according to another embodiment.

FIG. 2 shows another embodiment of the invention. Payment device 800 includes a display 810 and a memory 820. The payment device 800 is similar to the payment device 500 discussed above. However, here the display 810 is driven by a processor 906 external to the payment device 800. The external processor 906 may reside in an access device 908 (e.g., a POS terminal) at a merchant, but it may reside anywhere, so long as the processor 906 is able to drive the display 810. The access device 908 shown in FIG. 2 also includes output devices 914 (e.g., a display, speaker, etc.), input devices 916 (e.g., a keypad with buttons) and a contactless element 912 operatively coupled to the processor 906. As noted above, the external processor 906 may drive the display 810 by communicating via any method including, without limitation, contact and contactless methods. For example, the external processor 906 may send a signal to the contactless element 812 in the payment device 800 via the contactless element 912 in the access device 908.

It is noted that the payment device 800 may optionally incorporate memory 820 as well. This memory 820 would be in communication with the processor 906 (during use) and could be used to store card characteristics (e.g., payment and non-payment data). This data could be used, for instance and without limitation, by the processor 906 in generating updated payment data and/or card characteristics. A contactless element 812 such as an antenna may be operatively coupled to the memory 820. The contactless element 812 can communicate with the contactless element 912 that is in the access device 908.

Another embodiment of the invention is directed to a method for forming a payment device in the form of a card. Various manufacturing methods may be used. However, in one embodiment of the invention, the method comprises mounting a memory and a display on a plastic substrate. The plastic substrate may comprise any suitable plastic material. The memory comprises payment data and non-payment data. As noted above, a processor is configured to execute one or more instructions for displaying the payment data on the display. After mounting the memory on the plastic substrate, a plastic sheet can be laminated over the plastic substrate so that the memory and the display are sandwiched between the plastic substrate and the plastic sheet. The plastic sheet may be transparent or may have a hole in it so that the display can be seen through the plastic sheet. A payment card can thereafter be formed.

In the embodiments shown in FIGS. 1 and 2, data (such as coupon data) may be loaded into the memories 514, 820 in any suitable manner. For example, an issuer may load payment or non-payment data into the memories at issuance. In another embodiment, the entities such as merchants and the like may load data such as coupon data using an access device such as a POS terminal using a contact-based or contactless technology. In another embodiment, the payment devices 500, 800 may have long range antennas which may allow the data in the memories 514, 820 to be updated and/or supplemented.

Figure 3:
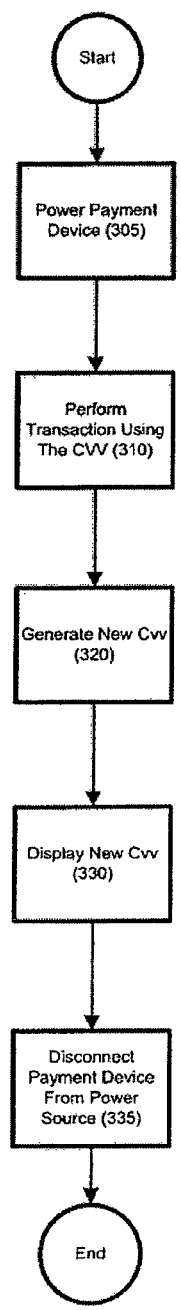
FIG. 3 depicts a method of using a payment service in a system comprising a payment device and a second device.

FIG. 3 shows a process of utilizing a payment device 500 (see FIG. 1) to perform a transaction according to an embodiment of the present invention. In this embodiment, the payment device 500 includes a display 510 to show a CVV value. At step 305, the payment device 500 is powered from a power source 508 (whether internal or external). At step 310, a transaction is performed using the CVV shown on display 510. At step 320, a new CVV is generated. In an embodiment, the new CVV is generated by the processor 512, and is initiated by a signal from a terminal (not shown). At step 330, the processor 512 drives the display 510 to show the new CVV. At step 335, the payment device 500 can be disconnected from the power source if desired. The display 510 preferably displays the new CVV even after being disconnected from the power source. It is apparent to those of ordinary skill in the art that step 310 may alternatively be performed after step 335.

It is understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM.

One or more features from any embodiment may be combined with one or more features of any other embodiment without departing from the scope of the invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system configured to conduct transactions, comprising:

a payment device comprising
 a display configured to display payment data for an account and non-payment data for the account, and
 a memory coupled to the display, the memory storing the payment data and the non-payment data for the account, wherein the payment device is in a form of a card, and further wherein the payment device does not have a built-in power source; and
an access device comprising
 a processor configured to dynamically generate and provide different payment data for each transaction conducted with the payment device, to the payment device, wherein the access device is external to the payment device,
wherein the payment device further comprises a first contactless element, wherein the access device further comprises a second contactless element, wherein the second contactless element transmits different payment data and different non-payment data to the first contactless element, and wherein the first contactless element transmits the payment data and the non-payment data to the second contactless element.

2. The system of claim 1, wherein the payment data comprises a primary account number associated with the account.

3. The system of claim 1, wherein the payment data comprises a card verification value.

4. The system of claim 1, wherein the non-payment data comprises a bank logo.

5. The system of claim 1, wherein the non-payment data comprises a coupon.

6. The system of claim 1, wherein the payment card is in a form of a contactless card.

7. The system of claim 1, wherein the payment data comprises authentication data.

8. The system of claim 1, wherein the non-payment data comprises a reward message.

9. The system of claim 1, wherein the display is a bistable display.

10. A method of using a system comprising (a) a device comprising a display configured to display payment data for an account and non-payment payment data for the account, and a memory coupled to the display, the memory storing the payment data and the non-payment data for the account, and a first contactless element, wherein the payment device is in a form of a card, and further wherein the payment device does not have a built-in power source, and (b) an access device comprising a processor configured to dynamically generate and provide different payment data and different non-payment data for each transaction conducted with the payment device, to the payment device, wherein the access device is external to the payment device, wherein the method comprises:
 receiving, by a second contactless element in the access device and from the first contactless element in the payment device, the payment data and the non-payment data; and
 transmitting, by the second contactless element in the access device and to the first contactless element in the payment device, different payment data and different non-payment data.

11. The method of claim 10 wherein the access device is a POS terminal.

12. The method of claim 10 wherein the payment data comprises a dynamic card verification value (dCVV2).

13. The method of claim 10 wherein the non-payment payment data comprises a coupon.

* * * * *